United States Patent

[11] 3,537,624

| [72] | Inventors | Jack E. Hartman<br>Holland;<br>Le Roy A. Wright, Saugatuck, Michigan |
|---|---|---|
| [21] | Appl. No. | 702,353 |
| [22] | Filed | Feb. 1, 1968 |
| [45] | Patented | Nov. 3, 1970 |
| [73] | Assignee | U.S. Industries, Inc.<br>New York, New York<br>a corporation of Delaware. by mesne assignments |

[54] ANIMAL FEED-DISPENSING APPARATUS
7 Claims, 5 Drawing Figs.

[52] U.S. Cl. .................................................... 222/503,
119/51.11, 119/56
[51] Int. Cl. .............................................. B65d 47/00,
A01k 05/00
[50] Field of Search........................................... 119/56,
51.11; 222/503, 504, 502, 517

[56] References Cited
UNITED STATES PATENTS
| 2,723,058 | 11/1955 | Gardes.......................... | 222/504 |
| 2,901,148 | 8/1959 | Cunningham et al......... | 222/502X |
| 3,180,318 | 4/1965 | Fisher............................ | 119/56 |
| 3,211,339 | 10/1965 | Piper et al..................... | 119/51.11X |

Primary Examiner—Hugh R. Chamblee
Attorney—Price, Heneveld, Huizenga and Cooper

ABSTRACT: A dispensing device for animal feed and the like including a walled enclosure with an inlet opening at the top and a discharge opening at the bottom, and with a pair of cooperative doorlike gate elements pivotally mounted to the enclosure which, when swung apart, open the discharge opening thereof and which, when swung together, close such opening to entrap feed within the enclosure. The two doorlike gate members directly carry the weight of feed entrapped within the enclosure, with the total weight of such feed being divided about equally thereupon, and the two gate members are interconnected for controlled and articulated operation and a spring biases them toward a closed position while an electrical solenoid is provided to overcome the spring and open both doors simultaneously.

Patented Nov. 3, 1970 3,537,624

INVENTORS
JACK E. HARTMAN
LEROY A. WRIGHT
BY Price, Heneveld
Huizenga & Cooper
ATTORNEYS

INVENTORS
JACK E. HARTMAN
LEROY A. WRIGHT
BY
ATTORNEYS

ANIMAL FEED-DISPENSING APPARATUS

BACKGROUND

Certain types of at least partially automated feeding systems for livestock and the like which have been used in the past have included an overhead feed-conveying means having a plurality of feed drop mechanisms located at desired positions beneath the conveyor, by which feed may be transferred from the conveyor to desired areas within the animal house. Such feed drops often include feed-accumulating enclosures which are remotely controllable to drop feed accumulated from the conveyor downward into the animal house only upon a predetermined control signal, which typically triggers the opening of all such accumulating enclosures at the same time.

By filling such enclosures completely before triggering them all to cause feed to be dumped therefrom, a measured amount of feed can be dumped or dropped from each, i.e., the volume of the accumulating component itself. Moreover, by providing a means for effectively adjusting or changing the volume of the accumulating components, the predetermined volume of feed to be dropped upon triggering of the accumulating components may be adjusted or periodically changed to conform to changing feeding habits. For example, the overhead conveyor may communicate with the interior of the accumulating component through a tube, the lower end of which may be vertically adjusted to thereby adjust the height within the accumulating enclosure to which feed can build up by operation of the overhead conveyor.

In the past, feed-accumulating enclosures of the type just noted typically comprises a boxlike member with a trap door swingably mounted to cover the opening in the bottom thereof, such that the trap door could be triggered open to discharge the contents of the enclosure. Normally, such doors were held in a closed position against the weight of the feed accumulated in the enclosure and resting directly upon the door by means of a heavy spring which was sufficiently strong to hold the door closed even though a full load of feed had accumulated, the total weight of which was pressing downwardly against the door. The door would then be opened by means of an electrical solenoid, which of course had to be strong enough to overcome the spring which was holding the door closed. This usually required a powerful high capacity solenoid, inasmuch as it was required to overcome a rather strong spring, in turn necessitated by the sizeable amount of feed which could be accumulated in the typical dispensing device when the same was entirely filled.

Such large-capacity solenoids are disproportionately expensive to incorporate in mechanisms of this nature, and they also cause installation difficulties and problems inasmuch as they draw considerable electrical current in order to operate, thereby requiring heavy-duty wiring, extra circuit protection, etc. Furthermore, solenoids of this nature are much more prone to failure than are smaller capacity units, largely as a result of the high current flow within their windings, but also to some extent as a result of the higher masses and forces involved in their operating parts.

SUMMARY

The present invention provides a feed-dispensing apparatus for providing the same basic function described above, but which includes a novel discharge door or gate arrangement requiring much less closure force and being much more readily responsive to the controlling operation of an actuating solenoid, thereby allowing much less powerful such devices to be used.

Briefly stated, the dispensing device of the invention comprises a walled enclosure with a feed-dispensing opening at its bottom which is selectively covered and uncovered by the operation of a pair of mutually cooperative gate elements or doors which are preferably of substantially the same size and which when in a closed position meet at a junction line located generally centrally of the discharge opening. By using more than a single such door and coordinating the opening and closing operation of the plural doors used, the load exerted by the feed filling the enclosure is divided over the number of doors utilized; consequently, no one door carries nearly as much of this load as the single door used in previous equipment, and therefore each of the plural doors in the present device requires less force to maintain it in a closed position and responds to a lesser degree of opening force. This effects a very significant savings in the cost of manufacture of the unit, resulting in decreased costs to the purchaser both in the purchase itself and also from the point of view of lowered maintenance and replacement expenses.

DRAWINGS

PREFERRED EMBODIMENT

Figure 1:
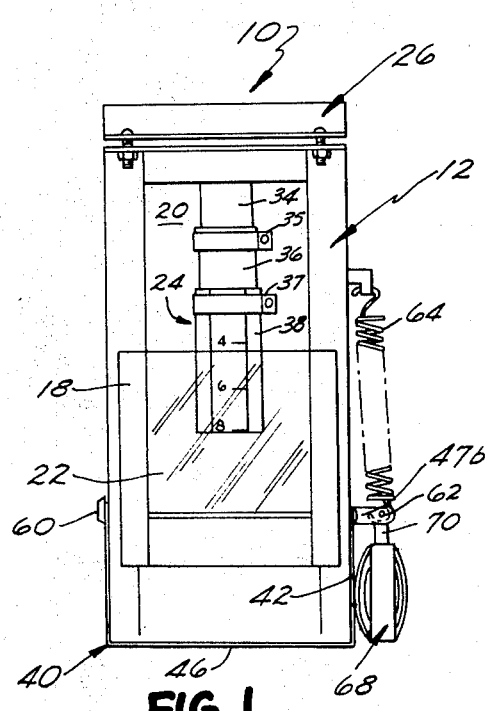
FIG. 1 is a side elevation of the apparatus of the invention.
Figure 2:
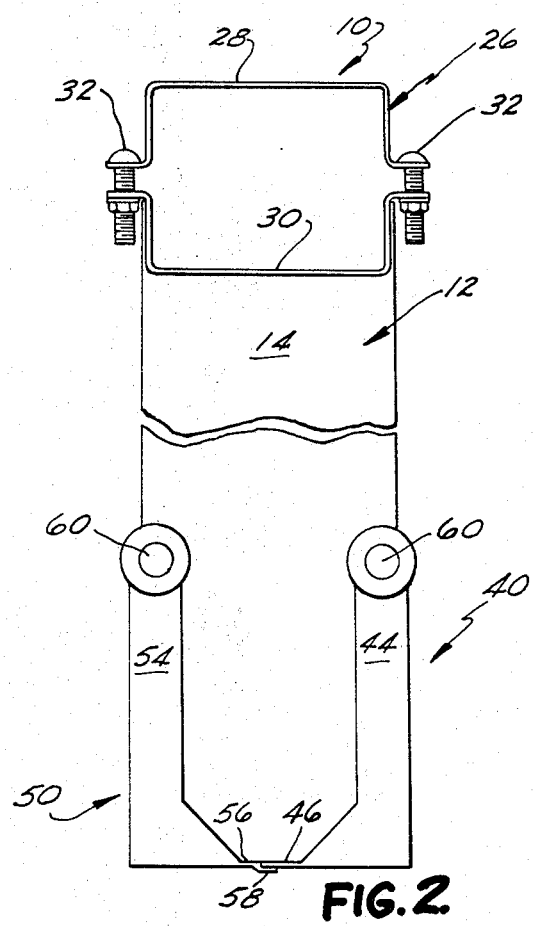
FIG. 2 is a left end elevation of the apparatus of FIG. 1.
Figure 3:
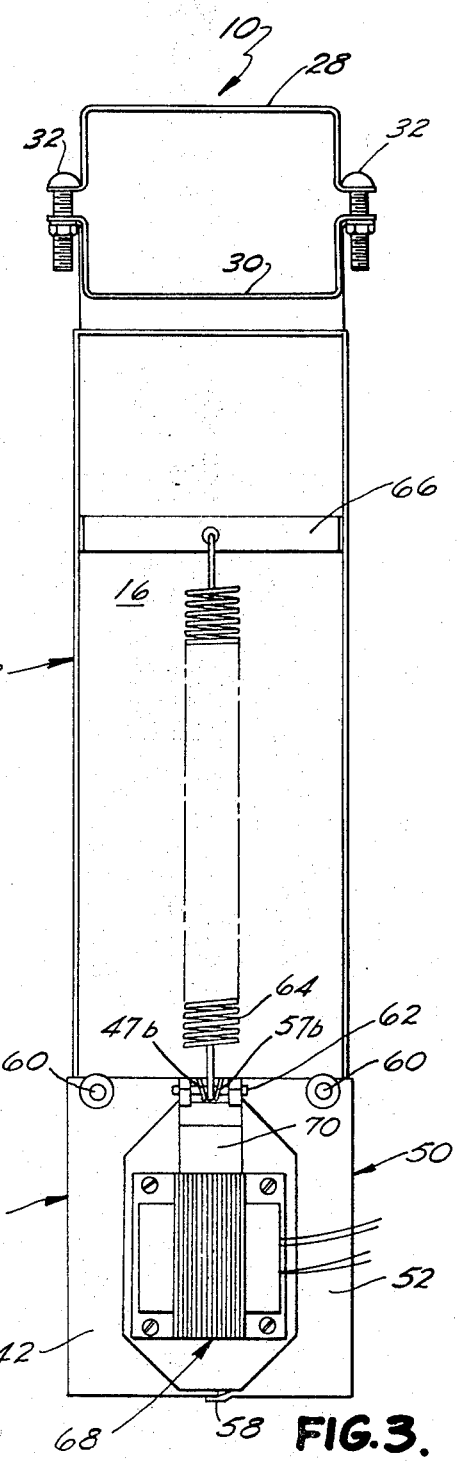
FIG. 3 is a right end elevation of the apparatus of FIG. 1.

Referring first to FIGS. 1, 2, and 3, the feed-dispensing apparatus 10 of the invention will be seen to comprise a walled enclosure 12 of vertically rectangulated configuration, having a pair of end walls 14 and 16 (FIGS. 2 and 3), between which extend front and rear sidewalls 18 and 20, respectively. As illustrated in FIG. 1, rear side 20 is substantially coextensive vertically with the end walls 14 and 16. The front wall 18, however, may if desired be foreshortened so as not to reach to the top of the enclosure; also, the front wall 18 may be partially comprised of a glass or other transparent window portion 22, which provides an inspection window through which the interior of the enclosure may be visually examined. The foreshortened height of the front wall 18 affords manual access into the interior of the enclosure, as for example for purposes of adjusting a control means 24, by which the level of the feed to be accumulated within the enclosure 12 may be adjusted.

At the top of the enclosure 12 a mounting clamp arrangement 26 is provided, by which the enclosure may be attached to an overhead feed-conveying means, in conjunction with which it is to operate and from which it is to receive feed. The mounting clamp arrangement 26 illustrated is comprised of a pair of symmetrically arranged generally U-shaped clamping parts 28 and 30 which are coextensive in length with the width of the enclosure 12, and which may be secured tightly around a feeder conveyor trough or tube by bolts 32 passing through appropriate apertures formed in lateral flange parts 34 of each such U-shaped clamping part. As will be understood, the generally right-angled U-shaped clamping parts 28 and 30 which are illustrated are of the type particularly adapted for use with feeder troughs of a rectangular cross section, such as are used in chain-type feeder conveyors; as will be further understood, different specific cross-sectional shapes of such clamping parts should be used for different shapes of feeder conveyor troughs.

The mounting clamp arrangement 26 just noted is intended to fit around the aforementioned feeder conveyor trough. The lower U-shaped clamp member 30 will have a centrally located aperture (not specifically shown) which in the mounting of the apparatus 10 should be centrally aligned or in register with a similar opening in the bottom of the aforementioned feeder conveyor trough, such that feed moved through the trough will drop downwardly through such registering openings and into the interior of the enclosure 12. In order to pass into the enclosure, however, such feed must fall through the control means 24 noted previously. This comprises a series of telescoped tubular portions 34, 36, and 38 (FIG. 1), with the first such portion 34 secured to the lower U-shaped clamp 30, and with tubular portion 36 attached to portion 34 by a screw-operated clamp 35. A similar clamp 37 attaches tubular portion 38 to like portion 36. As illustrated, tubular portion 38 may have suitable indicia numerals or the like inscribed thereupon, since by raising and lowering the bottom tube 38 to adjust the lower end extremity thereof, the maximum height to which feed will accumulate within the enclosure 12 will be adjusted accordingly. Thus, a ready means is provided for selecting and varying the amount of feed which the enclosure 12 will contain and dump.

The bottom extremity of the hollow, generally tubular enclosure 12 would, in accordance with the foregoing description thereof, by completely open-ended if not closed by other means. Such closure means are provided in accordance with the invention by a pair of gate elements 40 and 50, the specific structure of which is illustrated in FIG. 4, and the placement and mounting of which is illustrated in FIGS. 1, 2, and 3.

Figure 4:
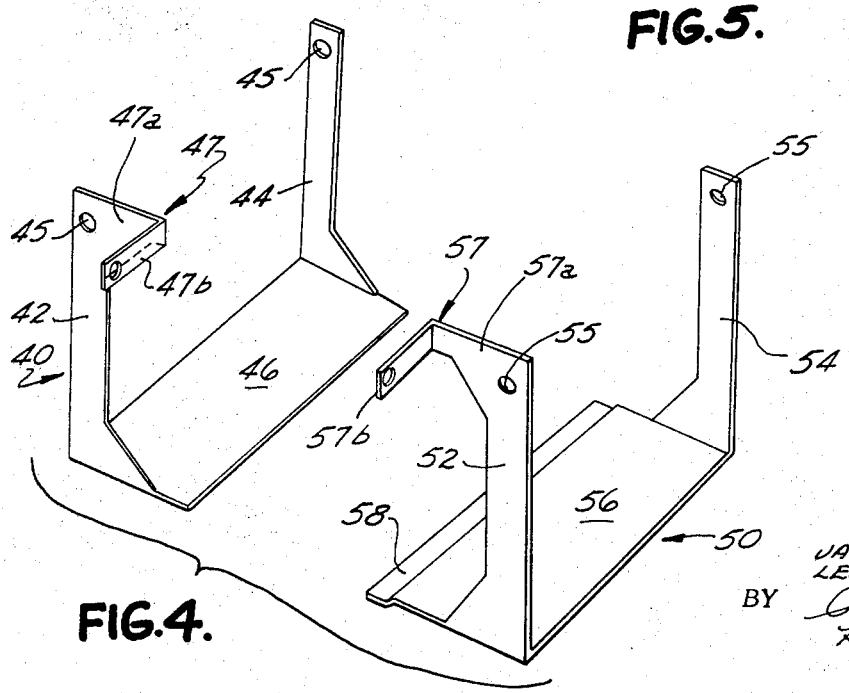
FIG. 4 is an enlarged perspective view of the two doorlike gate elements of the apparatus.

Referring first to FIG. 4, each of the gate elements 40, 50 comprises a generally U-shaped member having upstanding leg portions 42, 44 and 52, 54, respectively. These leg elements are interconnected by a web or center portion 46, 56, respectively, which forms a load-bearing door member for closing the bottom extremity of the walled enclosure 12, in a manner to be specifically seen subsequently.

Each of the upstanding leg elements 42, 44 and 52, 54 define a pivot mount for that leg and, consequently, for the entire gate element. As illustrated, such pivot mounts preferably comprise a hole 45 or 55, respectively, drilled or bored near the top of each such upstanding leg. The door members 46 and 56 formed by the respective gate elements 40 and 50 are of substantially equal size, so that each will cover about half of the discharge opening at the bottom of the enclosure 12; however, whereas door member 46 is substantially flat throughout its width, door member 56 has a downwardly offset lip portion 58 which extends along the entire length of the inner edge of this door. Lip 58 is provided for the purpose of forming an overlap with the inner edge of the thoroughly flat door 46, such that the lip 58 will underlie the edge of door 46 when the two doors are brought together.

This relationship is illustrated in FIGS. 2 and 3, where it will be observed that the flat door member 46 is generally coplanar with the flat portion of door 56, while the lip 58 rests immediately beneath the edge extremity of door 46. As also seen in these FIGS., the two gate elements 40 and 50 are attached to the enclosure 12 by means of pivot rods 60 which extend through the aforementioned pivot mount apertures 45 and 55 in the upstanding legs of the two gate elements. This effects a pivotal mounting of the gate elements by which in their first position (illustrated in FIGS. 2 and 3) these two elements effectively cooperate together to fully cover the discharge opening at the bottom of the enclosure 12. The usefulness and the advantage of providing the underlying lip 58 for fully closing the aforesaid discharge opening will be apparent; however, other arrangements of plural door or gate elements are no doubt possible by which such elements will fully close off an aperture or opening, and it is this relationship which the term "mutually articulated" is intended to connate, as the same is used herein.

In addition to the parts already named, each of the two gate elements 40 and 50 include structure at the top of the upstanding legs 42, 52 defining a lever arm means 47, 57 respectively (FIG. 4). This includes a portion 47a, 57a which is coplanar with the respective upstanding legs 42, 52 and which extends inwardly of the respective pivot-forming apertures 45, 55, as well as a portion 47b, 57b, which projects outwardly and away from the other portions of the respective gate elements, generally at right angles to the aforementioned portions 47a and 57a. As illustrated in FIGS. 1 and 3, the projecting portions 47b and 57b extend outwardly away from end wall 16 of the enclosure 12 a brief distance when the two gate elements 40 and 50 are pivotally mounted in place. An interconnecting pin 62 (FIG. 3) is slidably fitted through a small aperture in the end of each of the two projecting lever arm portions 47b and 57b to couple the same together for articulated and coordinated operation, and an elongated coil spring 64 has its lower end hooked around the center of interconnecting pin 62. This spring has an upper end which is anchored upon a fixed bracket 66 rigidly secured to end wall 16; thus, spring 64 acts to pull pin 62, and consequently the lever arm means 47 and 57, upwardly with respect to the enclosure 12. As will be understood, this force operates to maintain the two gate elements 40 and 50 in a position closing the discharge outlet at the bottom of the enclosure.

Figure 5:
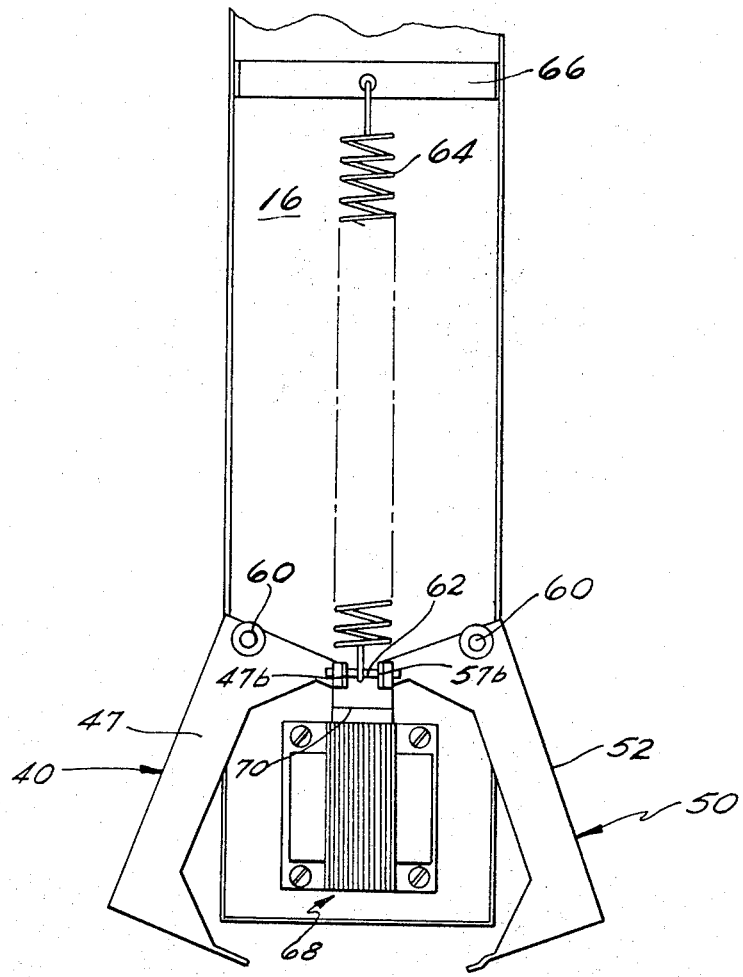
FIG. 5 is a fragmentary end elevation similar to FIG. 3 but showing the gate elements in an open position.

As illustrated in FIGS. 1, 3, and 5, an actuating means in the form of a solenoid 68 is mounted near the bottom of end wall 16, with the retractable plunger member 70 of the solenoid oriented upwardly and coupled to the projecting portions 47b and 57b of the gate element lever means 47 and 57, as for example by attachment to the aforementioned interconnecting pin 62. In accordance with this arrangement, energization of the winding of solenoid 68, causing its operator or plunger member 70 to be pulled downward toward the windings, will overcome the upward bias exerted by spring 64, pulling the lever arm means 47 and 57 downwardly and thereby pivoting each gate element 40 and 50 about its mounting pin 60 to open the discharge opening at the bottom of the enclosure (FIG. 5). This happens immediately upon actuation of the solenoid, of course, so that the enclosure will thereupon immediately dump its accumulated contents. As soon as the solenoid 68 is deenergized, the upward force of spring 64 immediately pivots the gate elements 40 and 50 back to a closed position, whereupon the enclosure may once again be refilled for subsequent operation.

Since the opening of the gate elements and the dumping of the accumulated feed from within the enclosure takes only a very brief time, it will be apparent that a controlled electrical pulse of a desired brief duration produced by a sequencing clock or timer may readily be utilized to operate the dispensing apparatus of the invention, and the same sequencer or timer may very well be used to operate the feeder conveyor which supplies feed to the dispensing apparatus of the invention, so that the entire system is automated. Thus, the capacity of the present device to operate as a metering apparatus, as well as a dispensing apparatus, by virtue of the feed quantity-controlling means 24 noted previously will be seen to provide a very desirable added feature, since not only may the apparatus be used in a fully automated system, but also it will deliver measured volumes of feed automatically, and these volumes may be changed from time to time as the particular needs of the livestock being fed may also change. The feature of the apparatus of providing a plurality of load-bearing doors for the discharge opening of the device is of paramount importance, however, since as previously pointed out, this drastically reduces the amount of weight or load borne by any single door, and it similarly reduces the power requirement for the actuating means such as the solenoid 68. Consequently, the present invention provides manufacturing economies not heretofore possible, while at the same time providing an apparatus of increased capability and better operability than previous devices of a somewhat similar nature.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

We claim:

1. In an animal feed-dispensing apparatus of the type characterized by a walled enclosure having an upper opening through which feed may enter, a lower discharge opening through which such feed may leave the enclosure, and discharge gate means movable toward and away from a position over such discharge opening to selectively cover or uncover the same and prevent or allow the discharge of feed therethrough, said discharge gate means including at least two movably mounted and mutually articulated gate elements which when moved toward one another to a predetermined position cooperate together to fully cover said discharge opening, the improvement wherein said discharge gate elements comprise a pair of cooperative doors, each pivotally carried upon said walled enclosure and having a common junction with the other when both are in their said discharge opening-covering position, each of said doors having a structure forming a pivot mount therefor by which such door is mounted to said enclosure, such structure being positioned above said discharge opening, said pivot mount-forming structure of each of said doors further defining a lever arm means, said lever arm means, when moved, effecting pivotal movement of the door associated therewith and thereby providing a means for operating such door, at least a portion of said lever arm means of each of said doors extending laterally of the pivot mount of such door in a direction generally toward the other of said doors, actuation means coupled to said lever arm means for moving the same to effect said pivotal door movement, and holding means coupled to said lever arm means to hold said doors in a closed position covering said discharge opening when said actuation means is inoperative.

2. The animal feed-dispensing apparatus of claim 1, wherein one of said doors overlaps the other at least slightly at the said common junction of such doors.

3. The animal feed-dispensing apparatus of claim 1, wherein said holding means comprises a spring engaging said lever arm means, for maintaining said doors in their discharge opening-covering positions against the weight of the feed supported by such doors.

4. In an animal feed-dispensing apparatus, of the type which includes a generally tubular upright enclosure having an upper feed entry opening and a lower feed discharge opening, and including movable discharge gate means for opening and closing the lower discharge opening to selectively discharge feed from the apparatus, the improvement wherein said discharge gate means comprises a pair of gate elements pivotally mounted on said enclosure for movement toward and into contact with one another to close said discharge opening and away from one another to open the same, each of said gate elements including a lower door portion having a size and shape sufficient to cover approximately half said discharge opening, each of said gate elements further having side portions extending upwardly from said door portion along the sides of said tubular enclosure and having a cross-sectional shape similar to the latter to fit about the outer periphery thereof, each of said gate elements further having upper portions extending from its said side portions peripherally of the enclosure and along the sides thereof toward the like portions of the other gate element, said upper portions comprising leverage means for moving the gate elements such that their respective door portions open and close said discharge opening, actuation means coupled to said leverage means for moving the same to effect said gate element movement, and holding means coupled to said leverage means to hold said door portions in a closed position covering said discharge opening when said actuation means is inoperative.

5. The improvement in animal feed-dispensing apparatus of claim 4, including a connector element loosely coupling said upper portions together.

6. The improvement of claim 5, wherein said upper portions include tab projections extending laterally outwardly of said enclosure.

7. The improvement of claim 6, wherein said connector element extends between said tab projections.